US008222782B2

(12) United States Patent
Saito

(10) Patent No.: US 8,222,782 B2
(45) Date of Patent: Jul. 17, 2012

(54) BRUSHLESS MOTOR

(75) Inventor: Katsunori Saito, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 204 days.

(21) Appl. No.: 12/918,800

(22) PCT Filed: Jan. 27, 2009

(86) PCT No.: PCT/JP2009/053704
§ 371 (c)(1),
(2), (4) Date: Aug. 20, 2010

(87) PCT Pub. No.: WO2009/107787
PCT Pub. Date: Sep. 3, 2009

(65) Prior Publication Data
US 2011/0001385 A1    Jan. 6, 2011

(30) Foreign Application Priority Data
Feb. 29, 2008    (JP) ................................. 2008-050162

(51) Int. Cl.
*H02K 7/06* (2006.01)
(52) U.S. Cl. ........................... 310/81; 310/68 B; 310/71
(58) Field of Classification Search .................... 310/71, 310/68 B, 81, 214, 208
See application file for complete search history.

(56) References Cited

U.S. PATENT DOCUMENTS

| | | | |
|---|---|---|---|
| 4,174,484 A | 11/1979 | Schmider | |
| 4,973,869 A * | 11/1990 | Cho | 310/68 B |
| 6,998,742 B2 * | 2/2006 | Yamaguchi et al. | 310/81 |
| 7,132,770 B2 * | 11/2006 | Yamaguchi et al. | 310/81 |
| 7,598,638 B2 * | 10/2009 | Yamaguchi | 310/81 |
| 7,626,295 B2 * | 12/2009 | Yamaguchi | 310/81 |
| 2004/0084980 A1 * | 5/2004 | Yamaguchi et al. | 310/81 |
| 2005/0127761 A1 | 6/2005 | Yashima | |
| 2006/0022537 A1 * | 2/2006 | Yamaguchi et al. | 310/81 |
| 2006/0028077 A1 * | 2/2006 | Yamaguchi et al. | 310/81 |
| 2007/0040462 A1 * | 2/2007 | Yamaguchi | 310/81 |
| 2008/0018187 A1 * | 1/2008 | Yamaguchi et al. | 310/81 |

FOREIGN PATENT DOCUMENTS

| | | |
|---|---|---|
| JP | 62-2368 U | 1/1987 |
| JP | 62-247750 A | 10/1987 |
| JP | 6-245455 A | 9/1994 |
| JP | 2005-137036 A | 5/2005 |

OTHER PUBLICATIONS

International Search Report dated Apr. 21, 2009 from International Application No. PCT/JP2009/053704.

* cited by examiner

*Primary Examiner* — Thanh Lam
(74) *Attorney, Agent, or Firm* — Beyer Law Group LLP

(57) ABSTRACT

Disclosed is a brushless motor which allows easy positioning of an air core coil and facilitates quick assembling of the coil because the air core coil is positioned by fitting an air core portion of the air core coil to bosses formed in a coil plate. Moreover, since no jig is required for the positioning of the coil, the positional precision of the coil can be stably attained, thereby enhancing the positional precision of the coil. Furthermore, although the positioning of the coil becomes difficult as the coil is reduced in size, the present invention is capable of easily coping with the thinning and miniaturization of the coils, i.e., thinning and miniaturization of the motor. In addition, the thinning and miniaturization of the motor can also be attained by arranging a circuit board and a coil plate in parallel to each other.

4 Claims, 6 Drawing Sheets

BRUSHLESS MOTOR

TECHNICAL FIELD

The present invention relates to a brushless motor that is embedded and used in portable information terminal devices such as mobile phone, AV equipment, entertainment devices, massage devices, fan motors, etc.

BACKGROUND ART

Prior art in this field includes Japanese Unexamined Patent Publication No. 2005-137036. A brushless motor disclosed in this publication comprises a circuit board arranged on a plate-like bracket, two air core coils arranged on the circuit board, and magnetic pieces arranged in air core portions of the air core coils.

DISCLOSURE OF THE INVENTION

Problems to be Solved

However, the above-mentioned conventional brushless motor has the following problems. That is, it is necessary to perform positioning of a coil by a jig when arranging the coil because the coil is arranged on the circuit board. By such positioning of the coil using the jig, irregularity in the shape of the jig and irregularity in the shape of the coil held by the jig have a cumulative effect, and thus errors may easily occur in the position of the coil. Also, any error in the position of the coil causes a deviation in the positional relationship between a magnet and the coil, so that there is a problem that the output torque of the motor may decrease. Especially, if the motor is thinned and miniaturized, the error has a significant effect.

It is an object of the present invention to provide a brushless motor that can improve the positional precision of coils.

Means for Solving the Problems

According to the invention, A brushless motor including a rotor and a stator received within a housing including a base portion, the brushless motor comprises: a circuit board arranged on the base portion and including a rotational position detector fixed thereto to detect a rotational position of the rotor; a magnet arranged to oppose to the rotational position detector and fixed to the rotor; an air core coil including an air core portion formed at a center thereof and arranged to oppose to the magnet; and a coil plate that includes a boss fitted to the air core portion of the air core coil and formed on an upper surface of the coil plate to position and arrange the air core coil, and is arranged in parallel to the circuit board on the base portion.

According to the brushless motor according to the present invention, since the air core portion of the air core coil is fitted to the boss to position the air core coil, the positioning can be easily and reliably performed and quick assembling work of the coil can be facilitated. Moreover, since no jig is required for the positioning of the coil, the positional precision of the coil can be stably attained, thereby enhancing the positional precision of the coils. Furthermore, although the positioning of the coil becomes difficult as the coils are reduced in size, the present invention is capable of easily coping with the thinning and miniaturization of the coils, i.e., thinning and miniaturization of the motor. In addition, the thinning and miniaturization of the motor can also be attained by arranging a circuit board and a coil plate in parallel to each other.

In this case, a magnetic body, the coils, and the circuit board do not have to be stacked because the coil plate is provided in parallel to the circuit board, thereby facilitating thinning of the motor. Furthermore, the size of the magnetic body can be arbitrarily selected because the magnetic body is arranged between two air core coils, the magnetic body can have a larger size compared to a magnetic body arranged in an air core portion of a coil, and the static position of a rotor can be surely controlled in cooperation with the magnet. In addition, the positional relationship between the coils and the magnetic body can be precisely determined through the coil plate since the coils and the magnetic body are fixed to the coil plate, and the rotor can be surely started by accurately stopping the rotor at a position subject to an excitation force between the coils and the magnet.

In this case, a seat portion of the coil plate, rather than a member made of metal, supports the rotor, and thus it is not necessary to provide a washer made of resin at a sliding portion between the rotor and a stator, thereby enabling thinning of the motor to the thickness of the washer. Also, the assembling work of the washer is not required in assembling the motor, thereby facilitating quick assembling of the motor.

According to this configuration, when the circuit board is inserted through a cutout portion in the radius direction of a shaft so that the circuit board is fitted into a fitting recess of the coil plate, the circuit board can be surely assembled on a base portion because it does not interfere with other members assembled in an axial direction of the shaft. Furthermore, by employing claw portions, the motor can be quickly assembled and backlash between the circuit board and the coil plate can be prevented. This suppresses a deviation caused by vibration in the positional relationship between a rotational position detector and the air core coils and prevents a reduction in the torque of the motor, thereby improving the reliability of the motor.

Effects of the Invention

According to the present invention, the positional precision of the coil can be improved.

BRIEF DESCRIPTIONS OF THE DRAWINGS

DESCRIPTIONS OF REFERENCE NUMERALS

1 . . . brushless motor,
10 . . . base portion,
10a . . . sidewall,
10b . . . cutout portion,
11 . . . lid portion,
12 . . . shaft,
20 . . . rotor,
21 . . . bearing,
22 . . . rotor yoke,
23 . . . magnet,
24 . . . weight,
30 . . . stator,
31 . . . circuit board, 32 ... coil plate,
32a ... seat portion,
32b, 32c ... boss,
32h, 32j ... claw portion,
32k ... fitting recess,
41 ... hole sensor IC (rotational position detector),
42, 43 ... air core coil,
42a, 43b ... air core portion,
44 ... cogging plate (magnetic body),
H ... housing Descriptions of Exemplary Embodiments Hereinafter, a brushless motor according to a preferred embodiment of the present invention will be described in detail.

Figure 1:
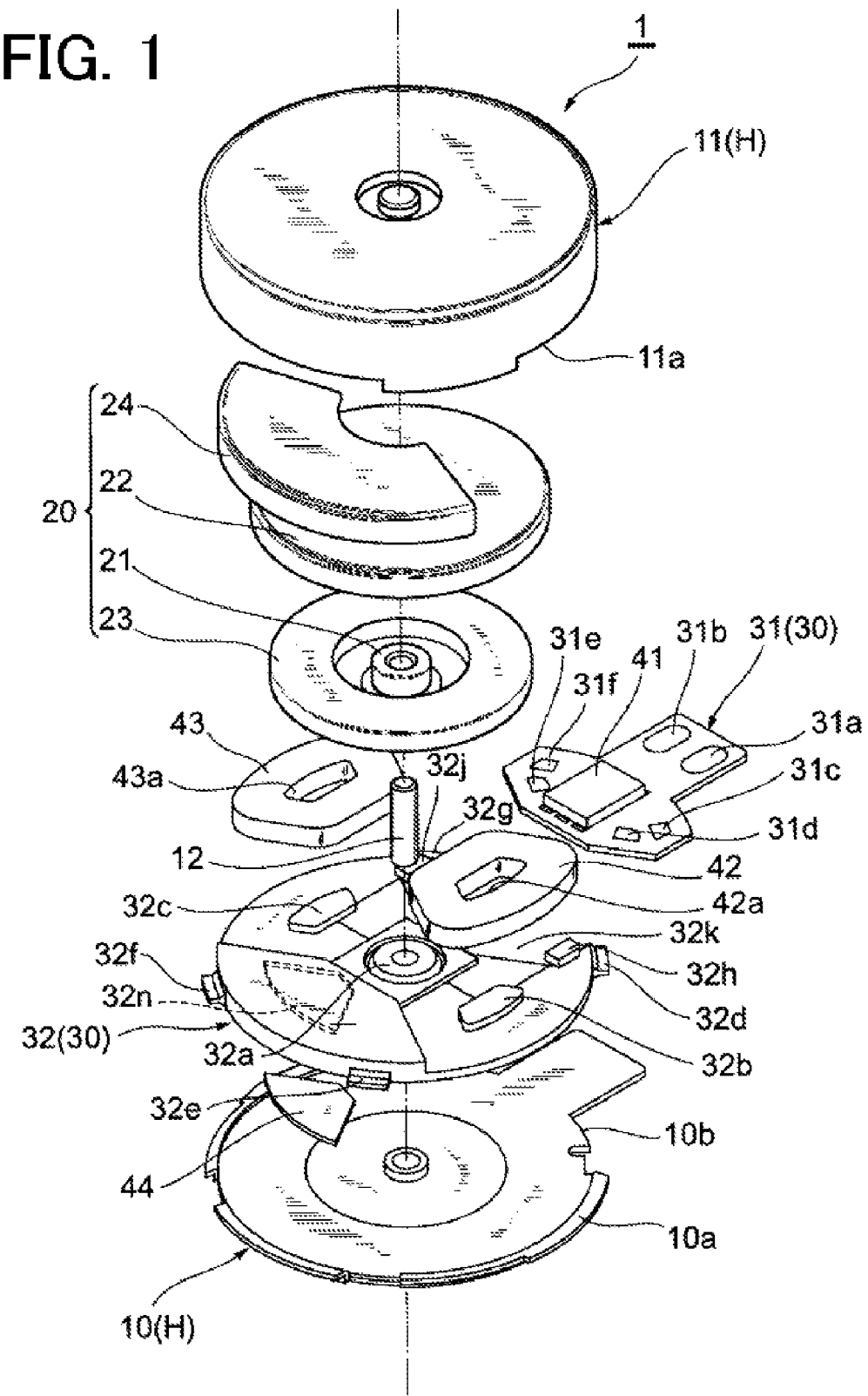
FIG. 1 is an exploded perspective view showing a brushless motor according to one embodiment of the present invention.

As shown in FIG. 1, the brushless motor 1 comprises a coin-type vibration motor of small size to be received in a device, such as a mobile phone. This brushless motor 1 has a housing H with a diameter of 10 mm including a base portion 10 and a lid portion 11 that are fitted to each other in the direction of the axis of rotation. Within the housing, the shaft 12 is fixed, and a rotor 20, with the shaft 12 serving as the central axis of rotation, is received.

The rotor 20 has a bearing 21 inserted into and passing through the shaft 12 and a disc-shaped rotor yoke 22 fixed to and rotating integrally with the bearing 21. A ring-shaped magnet 23 is fixed to the lower surface of the rotor yoke 22, centered on the shaft 12, and an N pole and an S pole are alternately magnetized to the magnet 23 in a circumferential direction. Also, an approximately crescent-shaped weight 24 is fixed to a portion of the outer periphery of the rotor yoke 22, and the rotor yoke 22 is eccentrically weighted by the weight 24, whereby vibration is generated by the rotation of the rotor 20.

Figure 2:
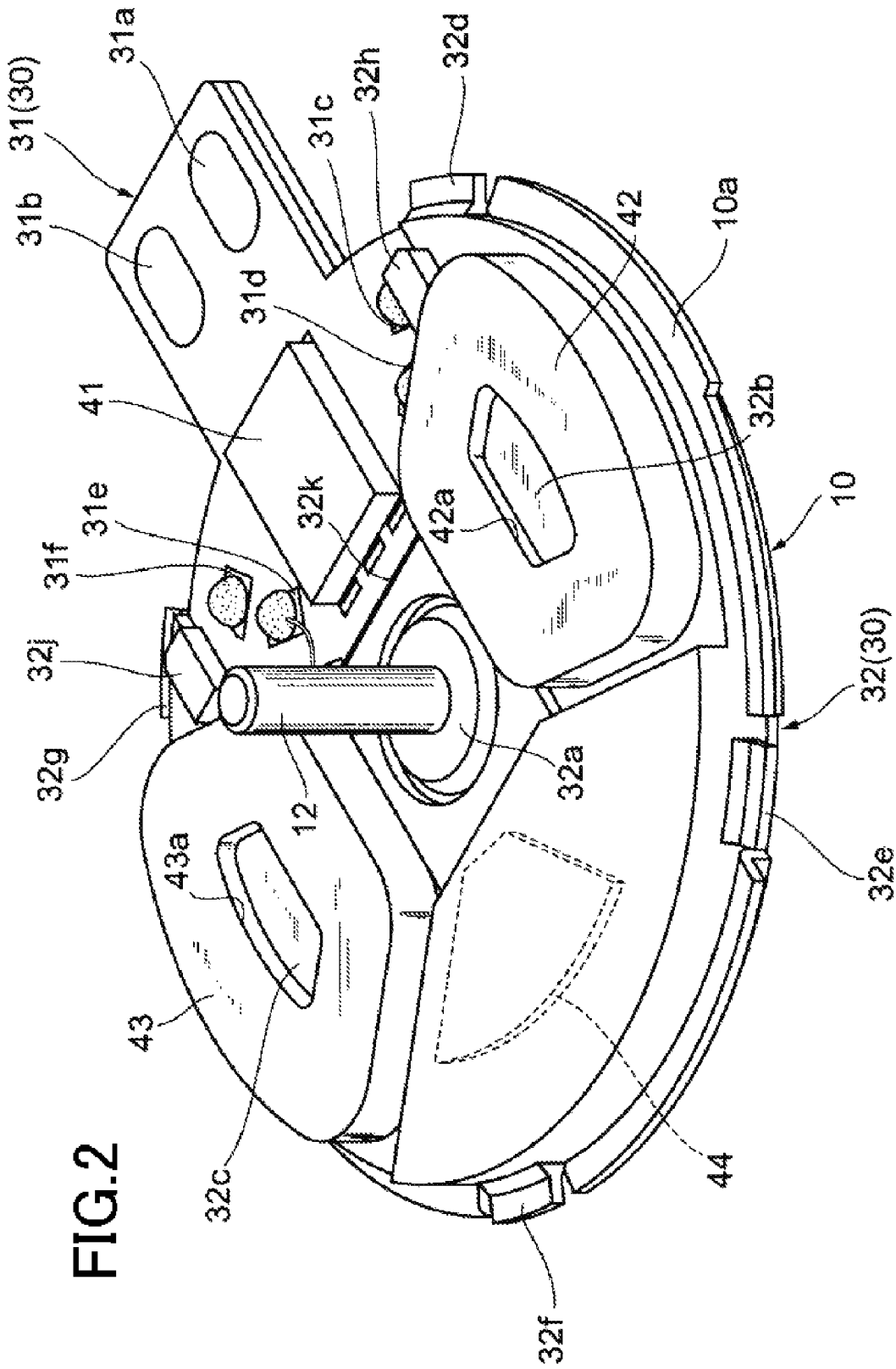
FIG. 2 is a perspective view showing a stator shown in FIG. 1.

As shown in FIG. 2, a stator 30 is provided above the base portion 10, and the stator 30 includes a circuit board 31 including a hole sensor IC (rotational position detector) 41 for detecting a magnetic energy of the magnet 23 and detecting a rotational position of the rotor 20 and a coil plate 32 made of resin mounted in parallel to the circuit board 31.

Figure 3:
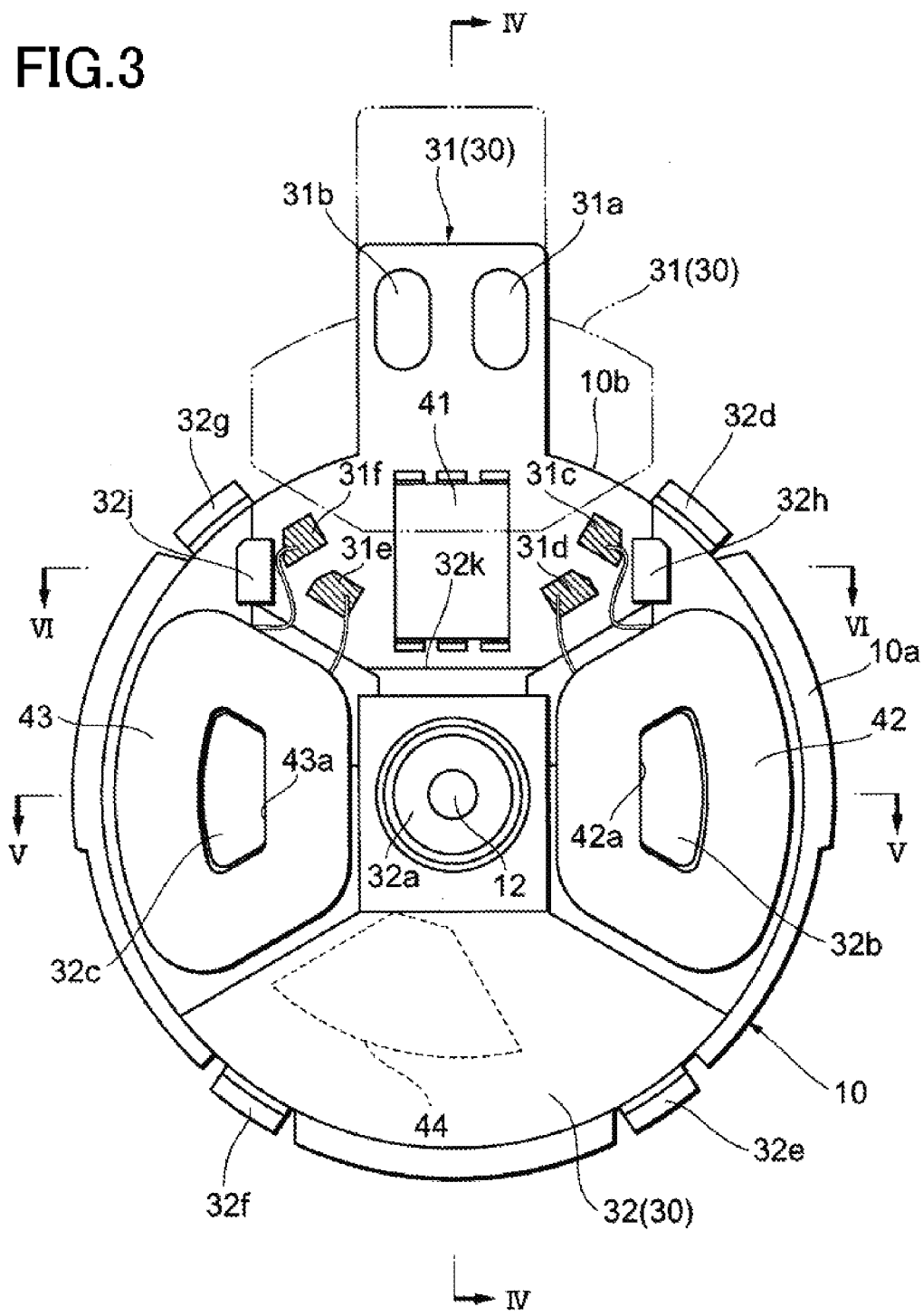
FIG. 3 is a top plan view showing the stator shown in FIG. 1.
Figure 4:
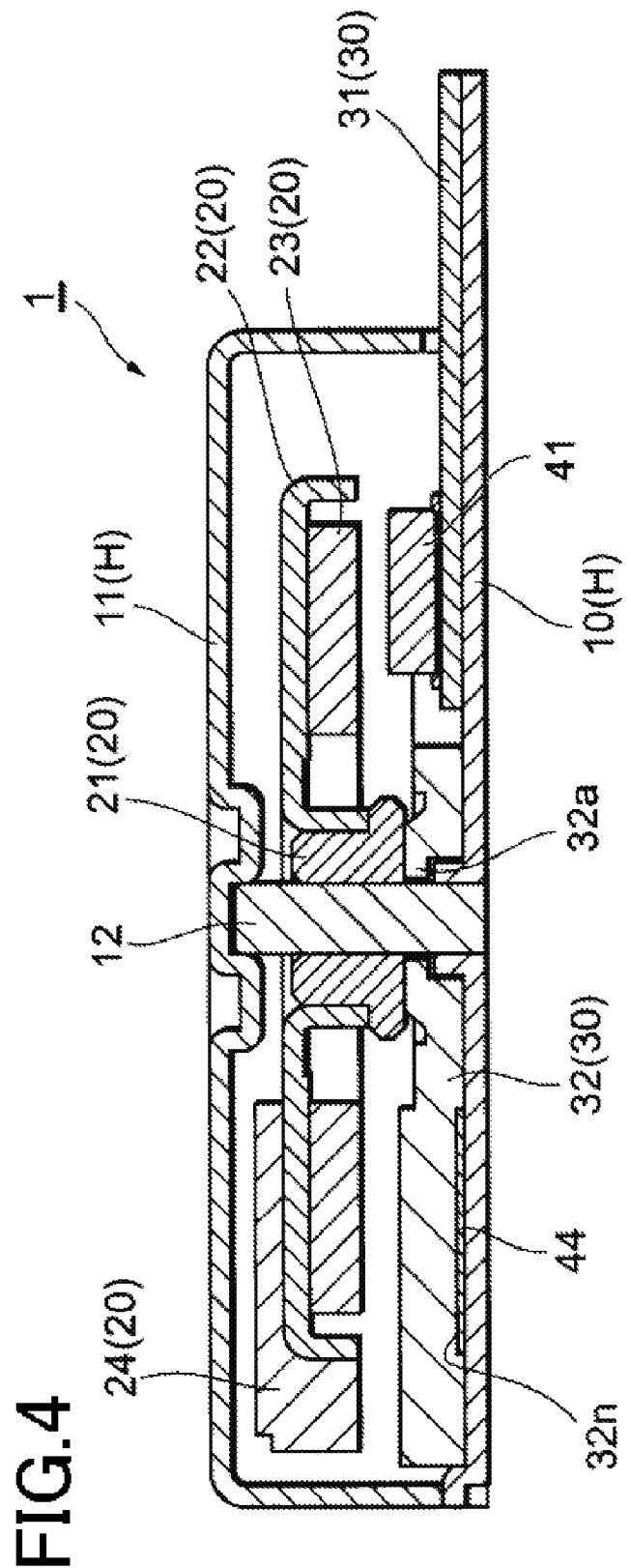
FIG. 4 is a cross-sectional view of the brushless motor taken along line IV-IV of FIG. 3.

As shown in FIGS. 3 and 4, a circular seat portion 32a centered on the shaft 12 is formed integrally with the coil plate 32. The bearing 21 of the rotor 20 is arranged on the seat portion 32a, and the rotor 20 is rotatably supported on the seat portion 32a through the bearing 21. In this manner, the seat portion 32a made of resin supports the rotor 20, and thus it is not necessary to provide a washer at a sliding portion between the rotor and the stator, thus enabling thinning of the motor to the thickness of the washer. Also, the assembling work of the washer is not required in assembling the motor, thereby facilitating quick assembling of the motor.

Figure 5:
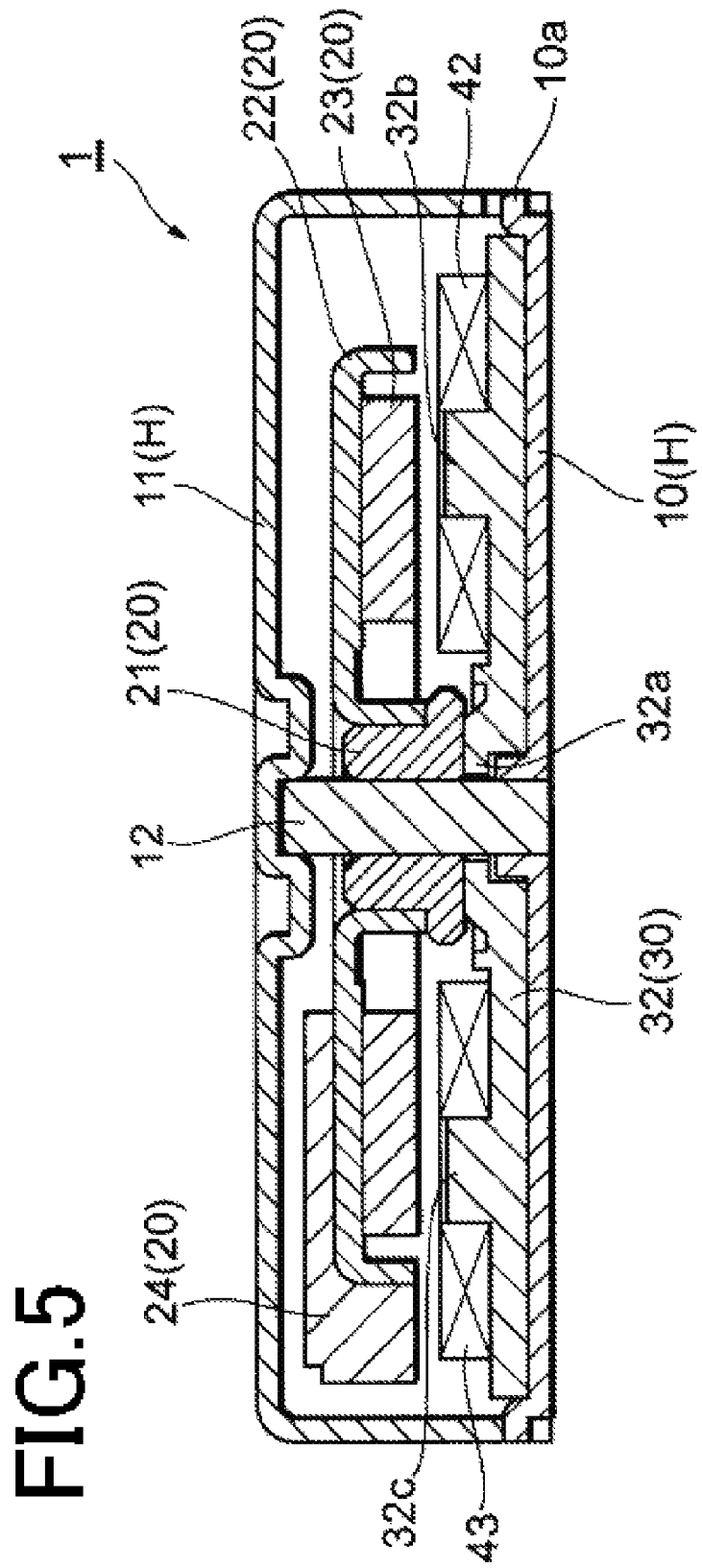
FIG. 5 is a cross-sectional view of the brushless motor taken along line V-V of FIG. 3.

As shown in FIGS. 3 and 5, air core coils 42 and 43 including approximately trapezoidal air core portions 42a and 43a formed at their centers are arranged on the coil plate 32 to oppose to the magnet 23. Approximately trapezoidal bosses 32b and 32c are arranged axially symmetrically relative to the shaft 12 on the upper surface of the coil plate 32, and each of the bosses 32b and 32c is lightly press-fitted into each of the air core portions 42a and 43a of the air core coils 42 and 43. The numbers of the air core coils and the coil portions may be three or more, respectively. As such, by fitting the air core portions 42a and 43a to the bosses 32b and 32c, the air core coils 42 and 43 can be easily and surely positioned by the coil plate 32, and the air core coils 42 and 43 can be quickly assembled. Moreover, since no jig is required for the positioning of the air core coils 42 and 43, the positional precision of the air core coils 42 and 43 can be stably attained, thereby enhancing the positional precision of the coils. Furthermore, although the positioning of the coils becomes difficult as the coils are reduced in size, the coils can be easily positioned by fitting the air core portions of the coils to the bosses of the coil plate, thereby easily coping with the thinning and miniaturization of the coils, i.e., thinning and miniaturization of the motor.

In addition, an approximately fan-shaped recess 32n is formed between the air core coils 42 and 43 on the lower surface of the coil plate 32, and a cogging plate (magnetic body) 44 having the same shape as the recess 32n is arranged on the recess 32n. The cogging plate 44 is formed of, for example, a silicon steel plate, and controls the static position of the rotor 20 by generating a cogging torque in cooperation with the magnet 23. Also, the rotor 20 is surely started by stopping the rotor 20 at a position subject to an excitation force between the magnet 23 and the air core coils 42 and 43.

As such, the air core coils 42 and 43 and the cogging plate 44 are arranged on the coil plate 32 so as not to be stacked thereon. Moreover, a fitting recess 32k for fitting the circuit board 31 therein is formed in the coil plate 32, and the circuit board 31 and the coil plate 32 are adjacent to each other on the same plane on the base portion 10. As the coil plate 32 and the circuit board 31 are provided in parallel to each other, the circuit board 31, the air core coils 42 and 43, and the cogging plate 44 are not stacked, and this configuration contributes to the thinning of the brushless motor 1.

Further, the cogging plate 44 can have a large size because the cogging plate 44 arranged on the coil plate 32 is arranged between the air core coils 42 and 43, and can surely control the static position of the rotor 20 by generating a cogging torque of sufficient strength. In addition, the positional relationship between the air core coils 42 and 43 and the cogging plate 44 can be precisely determined through the coil plate 32 since the air core coils 42 and 43 and the cogging plate 44 are fixed to the coil plate 32, and the rotor 20 can be easily started by accurately stopping the rotor 20 at a position subject to an excitation force between the magnet 23 and the air core coils 42 and 43.

As shown in FIGS. 2 and 3, four tongue pieces 32d to 32g protruding from the coil plate 32 are formed in the radius direction of the shaft 12 on the outer periphery of the coil plate 32, and spaced apart from each other in a circumferential direction. The tongue pieces 32d to 32g are formed integrally with the coil plate 32, and the tongue pieces 32d to 32g are pressed against a bottom end 11a of the lid portion 11. As a result, the coil plate 32 is sandwiched between the base portion 10 and the lid portion 11 by the tongue pieces 32d to 32g. Therefore, the coil plate 32 can be fixed to the housing H by a simple configuration. Moreover, the base portion 10 is welded along the bottom end 11a of the lid portion 11.

As shown in FIGS. 1 and 3, a cutout portion 10b for inserting the circuit board 31 therein is formed in a sidewall 10a of the base portion 10 in the radius direction of the shaft 12 along the upper surface of the base portion 10. When the circuit board 31 is inserted through the cutout portion 10b and fitted into the fitting recess 32k, the circuit board 31 can be surely assembled on the base portion 10 without interfering with other members assembled in the direction of the axis of rotation relative to the base portion 10.

Figure 6:
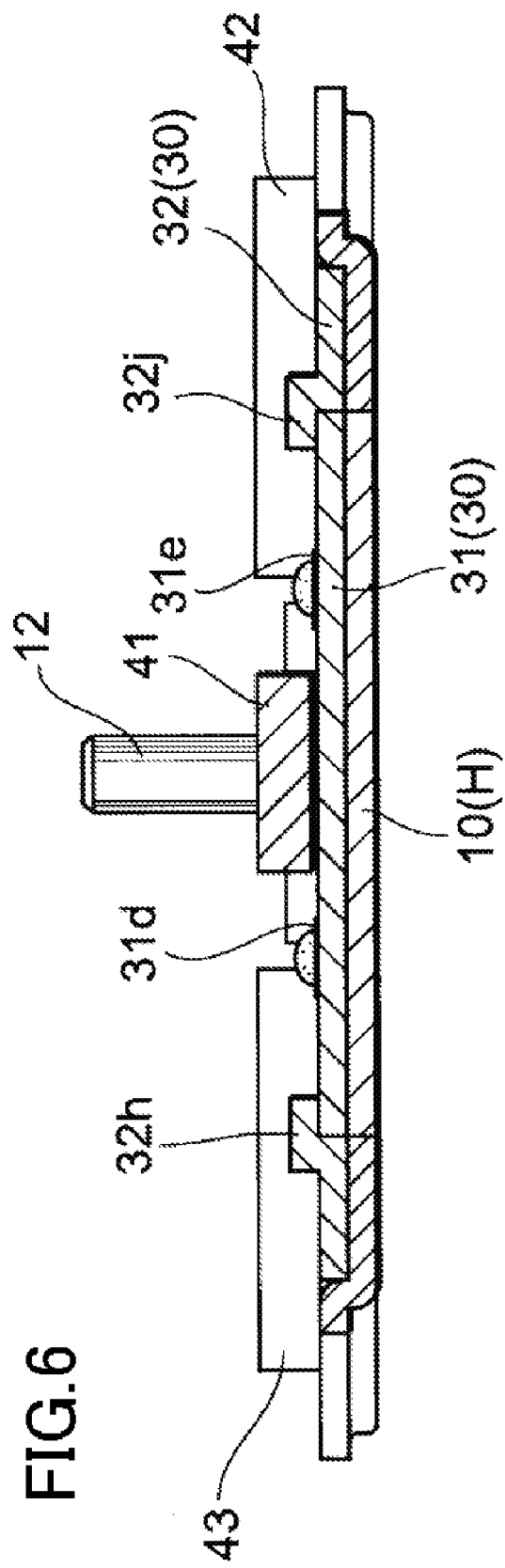
FIG. 6 is a cross-sectional view taken along line VI-VI of FIG. 3.

As shown in FIG. 6, a pair of claw portions 32h and 32j protruding toward the fitting recess 32k are formed on the coil plate 32. The circuit board 31 inserted from the cutout portion 10b is held between the claw portions 32h and 32j and the base member 10 simultaneously with the assembling of the circuit board 31, thus facilitating quick assembling of the motor. Moreover, backlash between the circuit board 31 and the coil plate 32 is prevented. This suppresses a deviation caused by vibration in the positional relationship between a hole sensor IC 41 and the air core coils 42 and 43 and prevents a reduction in the torque of the motor, thereby improving the reliability of the motor.

It is needless to say that the present invention is not limited to the foregoing embodiment. For example, as rotational position detecting means, a motor driving IC and a hole sensor may be separately provided, or a motor driver IC functioning to estimate the rotational position of the rotor from the current flowing through the motor or an induced voltage of the motor may be used. Moreover, the magnetic body may have a rod-like shape, as well as a plate-like shape. A rotating shaft may be provided within the housing, and the rotor yoke may be fixed to the rotating shaft.

The invention claimed is:

1. A brushless motor comprising:
 a housing including a base portion;
 a rotor and a stator received within the housing;
 a circuit board arranged on the base portion and including a rotational position detector fixed thereto to detect a rotational position of the rotor;
 a magnet arranged to oppose to the rotational position detector and fixed to the rotor;
 an air core coil including an air core portion formed at a center thereof and arranged to oppose to the magnet; and
 a coil plate that includes a boss fitted to the air core portion of the air core coil and formed on an upper surface of the coil plate to position and arrange the air core coil, and is arranged in parallel to the circuit board on the base portion.

2. The brushless motor according to claim 1, wherein at least two air core coils are arranged on the coil plate, and a magnetic body, arranged between the two air core coils to control the static position of the rotor in cooperation with the magnet, is fixed to the coil plate.

3. The brushless motor according to claim 1, wherein a seat portion for rotatably supporting the rotor is formed integrally with the coil plate.

4. The brushless motor according to claim 1, wherein a cutout portion for inserting the circuit board in the radius direction of the shaft is formed in a sidewall of the base portion, and a fitting recess for fitting the circuit board inserted from the cutout portion therein and claw portions protruding toward the fitting recess and holding the circuit board are formed on the coil plate.

\* \* \* \* \*